United States Patent
Shin et al.

(10) Patent No.: US 11,873,440 B2
(45) Date of Patent: Jan. 16, 2024

(54) SPECTRAL AND ANGULAR EMISSION CONTROL BASED TEMPERATURE SENSITIVE RADIATIVE COOLING DEVICE

(71) Applicant: KOREA ADVANCED INSTITUTE OF SCIENCE AND TECHNOLOGY, Daejeon (KR)

(72) Inventors: Jonghwa Shin, Seoul (KR); Suwan Jeon, Seoul (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 274 days.

(21) Appl. No.: 17/231,619

(22) Filed: Apr. 15, 2021

(65) Prior Publication Data

US 2021/0341233 A1 Nov. 4, 2021

(30) Foreign Application Priority Data

Apr. 16, 2020 (KR) .................. 10-2020-0045888
Apr. 7, 2021 (KR) .................. 10-2021-0045129

(51) Int. Cl.
C09K 5/00 (2006.01)

(52) U.S. Cl.
CPC ............ C09K 5/00 (2013.01); *F28F 2245/06* (2013.01)

(58) Field of Classification Search
CPC ......... C09K 5/00; C09K 5/02; F28F 2245/06; F28F 13/00; F28F 13/185; B60H 1/32; F25B 23/003
USPC .................................................. 428/690, 543
See application file for complete search history.

(56) References Cited

U.S. PATENT DOCUMENTS

| 7,110,650 | B2 * | 9/2006 | Kim | ..................... A61K 31/506 |
| | | | | 385/125 |
| 11,125,450 | B2 * | 9/2021 | Kapur | ................... F24F 5/0017 |
| 2015/0338175 | A1 * | 11/2015 | Raman | ................. F24F 5/0092 |
| | | | | 165/185 |
| 2016/0363396 | A1 * | 12/2016 | Liu | .......................... F28B 1/06 |
| 2017/0297750 | A1 * | 10/2017 | Liu | ....................... B64G 1/503 |
| 2019/0017758 | A1 * | 1/2019 | Raman | ................. F24F 5/0092 |
| 2019/0195519 | A1 * | 6/2019 | Kapur | ................... F24F 5/0017 |
| 2021/0219463 | A1 * | 7/2021 | Raman | ............... H05K 7/20309 |
| 2022/0019635 | A1 * | 1/2022 | Li | .......................... G06Q 50/01 |
| 2022/0119696 | A1 * | 4/2022 | Shin | ......................... B32B 9/04 |

OTHER PUBLICATIONS

Eden Rephaeli et al., Ultrabroadband Photonic Structures to Achieve High-Performance Daytime Radiative Cooling, Nano Lett., 2013, 13, 1457-1461. (Year: 2013).*
Dongliang Zhao et al., Radiative sky cooling-assisted thermoelectric cooling system for building applications, Energy, 2020, 190, 116322, pp. 1-20. (Year: 2020).*
Suwan Jeon, Jonghwa Shin, "Ideal spectral emissivity design for extreme radiative cooling", Cornell University, Applied Physics, arXiv:1910.09301 (physics.app-ph), Scientific Reports 10, Oct. 21, 2019; 11 pages.
Suwan Jeon, Jonghwa Shin, "Directional radiation for optimal radiative cooling", Research Article, Optics Express vol. 29, No. 6, Mar. 3, 2021; 11 pages.
Radiative sky cooling: Fundamental principles, materials, and applications, dated Apr. 16, 2019, 41 pages, Appl. Phys. Rev. 6, 021306 (2019).

* cited by examiner

*Primary Examiner* — Douglas J Mc Ginty
(74) *Attorney, Agent, or Firm* — Greenberg Traurig, LLP

(57) ABSTRACT

The present disclosure relates to a radiative cooling device which is sensitive to the ambient temperature and in which the emissivity changes depending on the infrared wavelength range and emission angle, and a method of cooling an object using the radiative cooling device.

11 Claims, 11 Drawing Sheets

*FIG. 1*

| | |
|---|---|
| Air | |
| ZnS (567 nm) | 9 |
| SiO$_2$ (318 nm) | 8 |
| SiC (592 nm) | 7 |
| Ge (229 nm) | 6 |
| ZnS (73 nm) | 5 |
| VO$_2$ (166 nm) | 4 |
| SiO$_2$ (846 nm) | 3 |
| Ge (790 nm) | 2 |
| SiO$_2$ (807 nm) | 1 |
| Ag (substrate) | |

$T_{cooler} = 300\ K$ $T_{cooler} = 280$ K

SPECTRAL AND ANGULAR EMISSION CONTROL BASED TEMPERATURE SENSITIVE RADIATIVE COOLING DEVICE

CROSS-REFERENCE TO RELATED APPLICATION

This application claims the benefit under 35 USC 119(a) of Korean Patent Applications No. 10-2020-0045888 filed on Apr. 16, 2020 and No. 10-2021-0045129 filed on Apr. 7, 2021 in the Korean Intellectual Property Office, the entire disclosures of which are incorporated herein by reference for all purposes.

TECHNICAL FIELD

The present disclosure relates to a radiative cooling device which is sensitive to the ambient temperature and in which the emissivity in the infrared range changes depending on the wavelength and angle, and a method of cooling an object using the radiative cooling device.

BACKGROUND

A radiative cooling device refers to a device capable of cooling an object lower than the ambient temperature by itself without external energy even under sunlight. In the current situation where the energy demand has increased worldwide due to global warming, the radiative cooling device which is helpful for cooling a building or an object without energy consumption may greatly affect the global energy industry.

A radiative cooling device disclosed in U.S. Patent Laid-open Publication No. 2017-0297750A is designed to have a high emissivity in a specific wavelength range (in the entire mid-IR range or from 8 μm to 13 μm) and at any angle (angle based on an axis perpendicular to a planar device) regardless of the temperature of the device itself, but exhibits an inefficiently low cooling rate and cannot sufficiently lower the temperature. Such a conventional radiative cooling device that cannot respond to changes in ambient temperature is vulnerable to changes in temperature of the device caused by external environmental factors (weather, wind, cloud, etc.) and thus cannot effectively exhibit cooling performance in actual applications (an exterior wall of a building, a body of a vehicle, etc.). Further, the emissivity depending on the wavelength and angle at each temperature is inappropriately designed, which causes degradation in the cooling performance.

SUMMARY

The present disclosure provides a radiative cooling device which is sensitive to the ambient temperature and shows an optimal angle-dependent emissivity spectrum when the temperature of the device changes, and a method of cooling an object using the radiative cooling device.

However, the problems to be solved by the present disclosure are not limited to the above-described problems. Although not described herein, other problems to be solved by the present disclosure can be clearly understood by a person with ordinary skill in the art from the following descriptions.

A first aspect of the present disclosure provides a radiative cooling device that is sensitive to the ambient temperature, and an angle-dependent emissivity spectrum in the infrared range changes depending on the relative high and low of the temperature of the radiative cooling device with respect to the ambient temperature.

A second aspect of the present disclosure provides a method of cooling an object using the radiative cooling device according to the first aspect.

According to the embodiments of the present disclosure, a radiative cooling device shows an emissivity that changes depending on the wavelength and angle so as to maximize the emission of radiative heat depending on the temperature of the device and thus can rapidly and effectively perform cooling to temperature lower than the ambient temperature without energy consumption through optical and thermal control. Conventionally, a device whose emissivity is isotropic and a unit in a wavelength range of from 8 μm to 13 μm has been most widely used. This device exhibits effective cooling performance only at normal temperature. Therefore, if the temperature of the device changes, the cooling performance is degraded. However, the radiative cooling device according to the present disclosure flexibly adjusts the angle-dependent emissivity spectrum by dividing the temperature of the device, which is changed depending on the external environment, and thus efficiently performs cooling at any temperature.

According to the embodiments of the present disclosure, the radiative cooling device includes a polymer layer composed of a multilayer thin film, a nanopattern and dispersed nanoparticles, and one or more selected from metamaterials and thus can show an angle-dependent emissivity spectrum which varies depending on the temperature. Any aspect other than the above-described aspects can be applied to the radiative cooling device of the present disclosure as long as it can show an angle-dependent emissivity spectrum which varies depending on the temperature. Therefore, it is possible to implement the radiative cooling device of the present disclosure in a simple structure with cheap materials.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 1 is a schematic diagram illustrating the structure of a radiative cooling device according to an example of the present disclosure.

FIG. 2A) $\theta=0°$, $\Phi=0°$ to $360°$; FIG. 2B) $\theta=60°$, $\Phi=0°$ to $360°$; FIG. 2C) $\theta=80°$, $\Phi=0°$ to $360°$.

FIG. 3A) T=300K; FIG. 3B) T=280K; FIG. 3C) T=260K; FIG. 3D) T=240K; a black region with the maximum emissivity of 1 and a white region with the minimum emissivity of 0.

DETAILED DESCRIPTION

Figure 2A:
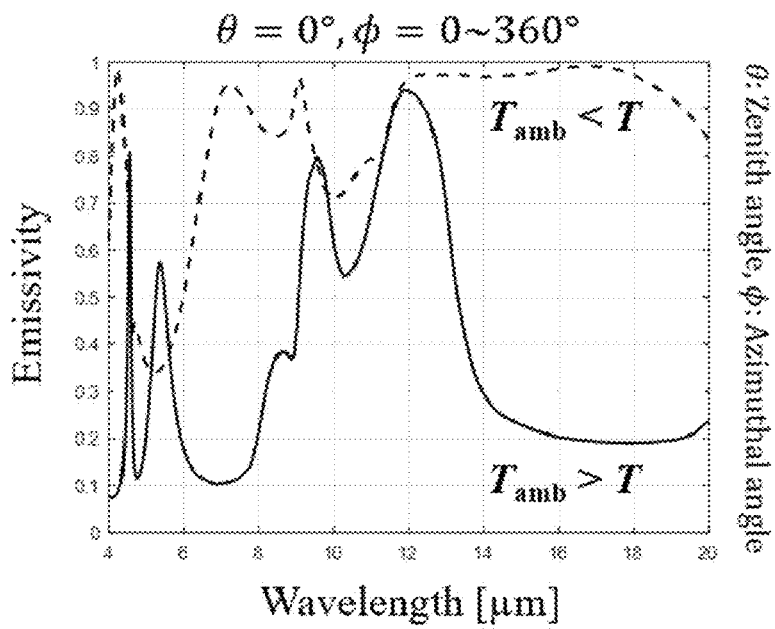
FIGS. 2A-2C show graphs of the emissivity depending on the temperature, wavelength and angle of the radiative cooling device according to an example of the present disclosure.

Through the whole document, the term "connected to" may be used to designate a connection or coupling of one element to another element and includes both an element being "directly connected to" another element and an element being "electronically connected to" another element via another element.

Through the whole document, the term "on" that is used to designate a position of one element with respect to another element includes both a case that the one element is adjacent to the other element and a case that any other element exists between these two elements.

Further, through the whole document, the term "comprises or includes" and/or "comprising or including" used in the document means that one or more other components, steps, operation and/or the existence or addition of elements are not excluded from the described components, steps, operation and/or elements unless context dictates otherwise; and is not intended to preclude the possibility that one or more other features, numbers, steps, operations, components, parts, or combinations thereof may exist or may be added. The term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for."

Through the whole document, the term "combination(s) of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Through the whole document, the term "sunlight" refers to the electromagnetic radiation of the sun including ultraviolet light, visible light and near infrared light (in a wavelength range of 0.3 μm to 4 μm).

Through the whole document, the term "mid-IR (MIR)" refers to the electromagnetic radiation with a wavelength of 4 μm or more including a wavelength of from 8 μm to 13 μm where the atmosphere is highly transparent thus allowing an object near ambient temperature to radiate thermal energy toward the cold universe.

Hereinafter, embodiments and examples of the present disclosure will be described in detail with reference to the accompanying drawings. However, the present disclosure is not limited to these embodiments, examples and drawings.

A first aspect of the present disclosure provides a radiative cooling device that is sensitive to the ambient temperature, and an angle-dependent emissivity spectrum in the infrared range changes depending on the relative high and low of the temperature of the radiative cooling device with respect to the ambient temperature.

In an embodiment of the present disclosure, the radiative cooling device can perform cooling to temperature lower than the ambient temperature without energy consumption. Specifically, the radiative cooling device according to the present disclosure shows an angle-dependent emissivity spectrum that can maximize the emission of radiative heat depending on the temperature of the device and thus can rapidly and effectively perform cooling to temperature lower than the ambient temperature without energy consumption through optical and thermal control.

In an embodiment of the present disclosure, the radiative cooling device may show changes in the angle-dependent emissivity spectrum in real time depending on changes in the external environment. Specifically, a conventional device is designed to have a high emissivity in a specific wavelength range (in the entire mid-IR range or from 8 μm to 13 μm) and at any angle regardless of the temperature of the device itself and thus cannot flexibly respond to changes in the external environment (cloud, wind, humidity, etc.), which results in a decrease in energy radiation efficiency and degradation in radiative cooling performance. However, the radiative cooling device according to the present disclosure flexibly adjusts the angle-dependent emissivity spectrum by dividing the temperature of the device, which is changed depending on the external environment, and thus efficiently performs cooling at any temperature.

In an embodiment of the present disclosure, as for the radiative cooling device in parallel with a ground surface, the angle-dependent emissivity spectrum may be represented by the following Equation 1, and as for the radiative cooling device not in parallel with the ground surface, the angle-dependent emissivity spectrum may be represented by the following Equation 2:

$$\varepsilon(\lambda,\Omega,T;\Omega_{sun},T_{amb},\alpha)=0.5\times[1+\mathrm{sgn}(I_{BB}(\lambda\Omega,T)-I_{sun}(\lambda,\Omega_{sun},T_{amb},\alpha)-I_{atm}(\lambda,\Omega,T_{amb},\alpha))]; \quad \text{[Equation 1]}$$

$$\varepsilon(\lambda,\Omega,T;\Omega_{sun},T_{amb},\alpha,R,\Omega_{rotation})=0.5\times[1+\mathrm{sgn}(I_{BB}(\lambda\Omega,T)-R(I_{sun}(\lambda,\Omega_{sun},T_{amb},\alpha)+I_{atm}(\lambda,\Omega,T_{amb},\alpha))-(1-R)I_{ground}(\lambda,\Omega_{sun},T_{amb},\alpha,\Omega_{rotation}))]. \quad \text{[Equation 2]}$$

Specifically, when the radiative cooling device is disposed in parallel with the ground surface and faces upwards, an angle-dependent emissivity spectrum $\varepsilon(\lambda,\Omega,T)$ in the infrared range depending on a temperature T of the radiative cooling device may be mathematically described using an angle-dependent spectral radiance $I_{BB}(\lambda,\Omega,T)$ of an ideal black-body (an angle-dependent spectral radiance corresponding to the temperature T; meaning the maxima angle-dependent spectral radiance to be emitted by a material), an angle-dependent spectral radiance $I_{sun}(\lambda,\Omega_{sun},T_{amb},\alpha)$ of the sun, and an angle-dependent spectral radiance $I_{atm}(\lambda,\Omega,T_{amb},\alpha)$ of the atmosphere in consideration of ambient environmental factors (incident angle $\Omega_{sun}$ of sunlight, temperature $T_{amb}$ of ambient atmosphere, environment variable $\alpha$ indicating season and weather environment, etc.). The radiative cooling device is designed to emit energy as much as possible with the maximum emissivity of 1 in a cooling condition $(I_{BB}(\lambda,\Omega,T)-I_{sun}(\lambda,\Omega_{sun},T_{amb},\alpha)-(\lambda,\Omega,T_{amb},\alpha) \geq 0)$ and suppress the absorption of radiative energy with the minimum emissivity of 0 in a heating condition $(I_{BB}(\lambda,\Omega,T)-I_{sun}(\lambda,\Omega_{sun},T_{amb},\alpha)-I_{atm}(\lambda,\Omega,T_{amb},\alpha)<0)$ and thus can show an angle-dependent emissivity spectrum that can maximize the emission of radiative heat. The radiative cooling device of the present disclosure refers to a device that shows an angle-dependent emissivity spectrum based on the above-described principle. Meanwhile, the angle-dependent emissivity spectrum can be represented by the following Equation 1 by using a sgn( ) function where if the amount in parentheses is positive, a simple mathematical symbol is 1 and if the amount in parentheses is negative, the simple mathematical symbol is −1 ($\lambda$ is the emission wavelength and $\Omega$ is the emission angle including the azimuth angle and the zenith angle in a spherical coordinate system based on an axis perpendicular to the ground surface).

$$\varepsilon(\lambda,\Omega,T;\Omega_{sun},T_{amb},\alpha)=0.5\times[1+\mathrm{sgn}(I_{BB}(\lambda,\Omega,T)-I_{sun}(\lambda,\Omega_{sun},T_{amb},\alpha)-I_{atm}(\lambda,\Omega,T_{amb},\alpha))]$$ [Equation 1]

Specifically, when the radiative cooling device is not in parallel with the ground surface and faces a surrounding object (ground surface, surrounding building, etc.), the angle-dependent emissivity spectrum $\varepsilon(\lambda,\Omega,T)$ in the infrared range can be described by the following modified Equation 2 including additional environmental factors (reflectivity R of the surrounding object, tilt angle $\Omega_{rotation}$ of the device with respect to the ground surface, etc.) and an angle-dependent spectral radiance $I_{ground}(\lambda,\Omega_{sun},T_{amb},\alpha,\Omega_{rotation})$ of the surrounding object. Here, the radiative cooling device is designed to emit energy as much as possible with the maximum emissivity of 1 in a cooling condition $(I_{BB}(\lambda,\Omega,T)-R(I_{sun}(\lambda,\Omega_{sun},T_{amb},\alpha)+I_{atm}(\lambda,\Omega,T_{amb},\alpha))-(1-R)I_{ground}(\lambda,\Omega_{sun},T_{amb},\alpha,\Omega_{rotation})\geq 0)$ and suppress the absorption of radiative energy with the minimum emissivity of 0 in a heating condition $(I_{BB}(\lambda,\Omega,T)-R(I_{sun}(\lambda,\Omega_{sun},T_{amb},\alpha)+I_{atm}(\lambda,\Omega,T_{amb},\alpha))-(1-R)I_{ground}(\lambda,\Omega_{sun},T_{amb},\alpha,\Omega_{rotation})<0)$ and thus can show an angle-dependent emissivity spectrum that can maximize the effective emission of radiative heat.

$$\varepsilon(\lambda,\Omega,T;\Omega_{sun},T_{amb},\alpha,R,\Omega_{rotation})=0.5\times[1+\mathrm{sgn}(I_{BB}(\lambda,\Omega,T)-R(I_{sun}(\lambda,\Omega_{sun},T_{amb},\alpha)+I_{atm}(\lambda,\Omega,T_{amb},\alpha))-(1-R)I_{ground}(\lambda,\Omega_{sun},T_{amb},\alpha,\Omega_{rotation}))]$$ [Equation 2]

In an embodiment of the present disclosure, when the temperature of the radiative cooling device is equal to or higher than the ambient temperature, the radiative cooling device in parallel with a ground surface may emit thermal radiation in a wavelength of 4 μm or more at an angle of from 0° to 90° based on an axis perpendicular to the ground surface and the radiative cooling device not in parallel with the ground surface may emit thermal radiation in a wavelength of 4 μm or more at an angle of from 0° to 180° based on the axis perpendicular to the ground surface. When the temperature of the radiative cooling device is lower than the ambient temperature, the radiative cooling device may emit thermal radiation in a wavelength of from 8 μm to 13 μm at an angle of from 0° to 60° based on the axis perpendicular to the ground surface regardless of placement. Specifically, a relation in amount between emission and absorption of radiative energy is determined by the temperatures of the radiative cooling device and the ambient atmosphere. Therefore, the optimum emission wavelength range may be changed from the entire wavelength range of 4 μm or more to a wavelength range of from 8 μm to 13 μm and the optimum angle range may be changed from the range of from 0° to 90° to the range of from 0° to 60° based on the axis perpendicular to the ground surface when the device is in parallel with the ground surface, depending on whether the temperature of the radiative cooling device is higher or lower than the ambient temperature. A device with an angle-dependent emissivity spectrum, such as the conventional device, which is designed regardless of the temperature effectively operates only in a very narrow temperature range (mainly at normal temperature). For example, a device designed to have emissivity in a wavelength range of from 8 μm to 13 μm at any angle exhibits an inefficiently low cooling rate when the device is heated to the normal temperature or more, and a device designed to have emissivity in the entire wavelength range of 4 μm or more at any angle cannot sufficiently lower the temperature. However, the radiative cooling device according to the present disclosure is designed to emit radiative heat into the universe through broad wavelength range of 4 μm or more at an angle of from 0° to 90° (for the radiative cooling device in parallel with the ground surface) or from 0° to 180° (for the radiative cooling device not in parallel with the ground surface) based on the axis perpendicular to the ground surface when the temperature of the radiative cooling device is equal to or higher than the ambient temperature. Also, the radiative cooling device according to the present disclosure is designed to emit radiative heat into the universe in a wavelength range of from 8 μm to 13 μm at an angle of from 0° to 60° based on the axis perpendicular to the ground surface when the temperature of the radiative cooling device is lower than the ambient temperature. Thus, the radiative cooling device according to the present disclosure can efficiently perform cooling.

In an embodiment of the present disclosure, the radiative cooling device in parallel with the ground surface performs emission in the entire wavelength range of 4 μm or more at an angle of from 0° to 90° based on the axis perpendicular to the ground surface when the temperature of the radiative cooling device is equal to or higher than the ambient temperature, and performs emission in a wavelength range of from 8 μm to 13 μm at an angle of from 0° to 60° when the temperature of the radiative cooling device is lower than the ambient temperature.

In an embodiment of the present disclosure, the radiative cooling device not in parallel with the ground surface performs emission in the entire wavelength range of 4 μm or more at an angle of from 0° to 180° based on the axis perpendicular to the ground surface when the temperature of the radiative cooling device is equal to or higher than the ambient temperature, and performs emission in a wavelength range of from 8 μm to 13 μm at an angle of from 0° to 60° when the temperature of the radiative cooling device is lower than the ambient temperature.

In an embodiment of the present disclosure, when the radiative cooling device is in parallel or not in parallel with the ground surface, the radiative cooling device emits radiative heat in a wavelength range of from 10 μm to 12 μm at an angle of from 0° to 60° based on the axis perpendicular to the ground surface and thus can reach an extreme cooling temperature. Specifically, the radiative cooling device may emit thermal radiation in a wavelength of from 10 μm to 12

µm at an angle of from 0° to 60° based on the axis perpendicular to the ground surface regardless of placement, and, thus, the radiative cooling device is lower in temperature by 5° C. or more than the ambient atmosphere. It was confirmed that the radiative cooling device according to the present disclosure needs to emit radiative heat only in a narrow wavelength range of from 10 µm to 12 µm at an angle of lower than 60° based on the axis perpendicular to the ground surface in order to reach an extreme cooling temperature. Accordingly, it was confirmed that the radiative cooling device can be lower in temperature by at least 5° C. than the ambient atmosphere and can reach a cooling temperature lower by at least 20° C. than the conventional radiative cooling device. The extreme cooling temperature may be changed depending on a condition such as the atmosphere or season and may be the lowest cooling temperature which can be reached by the radiative cooling device. More specifically, an object which is disposed under the radiative cooling device and is to be cooled by the radiative cooling device ideally exchanges heat with the radiative cooling device but does not exchange heat (radiation, conduction, convection, etc.) with the others. Therefore, when the radiative cooling device reaches the extreme cooling temperature, the object may be extremely cooled.

In an embodiment of the present disclosure, when the temperature of the radiative cooling device is equal to or higher than the ambient temperature, the radiative cooling device in parallel with the ground surface sequentially emits thermal radiation in the entire wavelength range of 4 µm or more at an angle of from 0° to 90° based on the axis perpendicular to the ground surface, and when the temperature of the radiative cooling device is lower than the ambient temperature, the radiative cooling device emits thermal radiation in a wavelength range of from 8 µm to 13 µm at an angle of from 0° to 60° based on the axis perpendicular to the ground surface. Then, when the temperature of the radiative cooling device decreases, the radiative cooling device emits thermal radiation in a wavelength range of from 10 µm to 12 µm at an angle of from 0° to 60° based on the axis perpendicular to the ground surface. Accordingly, the radiative cooling device together with the object disposed under the radiative cooling device can reach the extreme cooling temperature.

In an embodiment of the present disclosure, when the temperature of the radiative cooling device is equal to or higher than the ambient temperature, the radiative cooling device not in parallel with the ground surface sequentially emits thermal radiation in the entire wavelength range of 4 µm or more at an angle of from 0° to 180° based on the axis perpendicular to the ground surface, and when the temperature of the radiative cooling device is lower than the ambient temperature, the radiative cooling device emits thermal radiation in a wavelength range of from 8 µm to 13 µm at an angle of from 0° to 60° based on the axis perpendicular to the ground surface. Then, when the temperature of the radiative cooling device decreases, the radiative cooling device emits thermal radiation in a wavelength range of from 10 µm to 12 µm at an angle of from 0° to 60° based on the axis perpendicular to the ground surface. Accordingly, the radiative cooling device together with the object disposed under the radiative cooling device can reach the extreme cooling temperature.

In an embodiment of the present disclosure, the angle-dependent emissivity spectrum may be changed by a change in refractive index of a constituent material of the radiative cooling device depending on the ambient temperature, a change in refractive index caused by a phase change, or both of them. Specifically, the constituent material of the radiative cooling device is sensitive to the ambient temperature and changes in refractive index depending on the temperature range. A whole or a part of the constituent material of the radiative cooling device may have different refractive indexes in each temperature range. Also, the difference in refractive index may be the amount of change in properties based on a conductor, a semiconductor and a dielectric. If a material does not undergo a phase change but has a great change in refractive index at each temperature, it can be used as the constituent material. If a material exhibits the same electrical characteristics but has a great change in refractive index at each temperature, it can be used as the constituent material. As a non-limiting example, a material, which acts as a dielectric at a temperature lower than the ambient temperature and as a conductor at a temperature equal to or higher than the ambient temperature, can be used as the constituent material of the radiative cooling device according to the present disclosure.

In an embodiment of the present disclosure, the radiative cooling device may include a polymer layer composed of a multilayer thin film, a nanopattern and dispersed nanoparticles, and one or more selected from metamaterials, but is not limited thereto. Specifically, the radiative cooling device includes a polymer layer composed of a multilayer thin film, a nanopattern and dispersed nanoparticles, and one or more selected from metamaterials and thus can show an angle-dependent emissivity spectrum which varies depending on the temperature. Any aspect other than the above-described aspects can be applied to the radiative cooling device of the present disclosure as long as it can show an angle-dependent emissivity spectrum which varies depending on the temperature.

In an embodiment of the present disclosure, a whole or a part of the radiative cooling device may include a first material which changes in refractive index depending on the ambient temperature, a second material which changes in refractive index caused by a phase change depending on the ambient temperature, or both of them, but is not limited thereto.

In an embodiment of the present disclosure, a whole or a part of the radiative cooling device may include one or more selected from doped vanadium dioxide ($VO_2$), doped or undoped $V_xO_y$ (x may be an integer of from 2 to 4 and Y may be an integer of from 2 to 10), paraffin, and paraffin-based organic or inorganic phase-change materials (PCM), but is not limited thereto. In particular, a whole or a part of the radiative cooling device doped vanadium dioxide ($VO_2$), and vanadium dioxide ($VO_2$) undergoes a dielectric-metal phase change at about the normal temperature and thus can be applied to the radiative cooling device of the present disclosure. The paraffin-based organic phase-change material may be paraffin $C_nH_{2n+2}$. Here, n may be equal to or higher than 10 and more specifically from 10 to 34.

Referring to FIG. 1 and FIGS. 2A-2C, a whole or a part of the radiative cooling device according to the present disclosure may include vanadium dioxide ($VO_2$). In general, $VO_2$ acts as a dielectric at a temperature equal to or lower than a reference temperature of from 60° C. to 70° C. and as a conductor at a temperature higher than the reference temperature. Through doping with various materials, the reference temperature for $VO_2$ can be lowered to about the normal temperature (25° C.) (FIG. 1). Thus, it is possible to design a device that shows different angle-dependent emissivity spectra at a temperature equal to or higher than the temperature of the atmosphere and a temperature lower than the temperature of the atmosphere, respectively (FIGS.

Figure 2B:
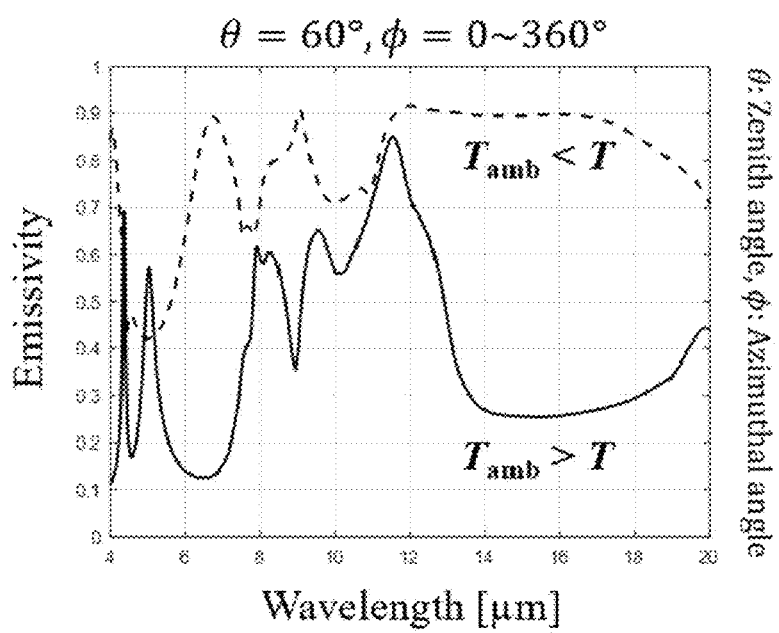
Figure 2C:
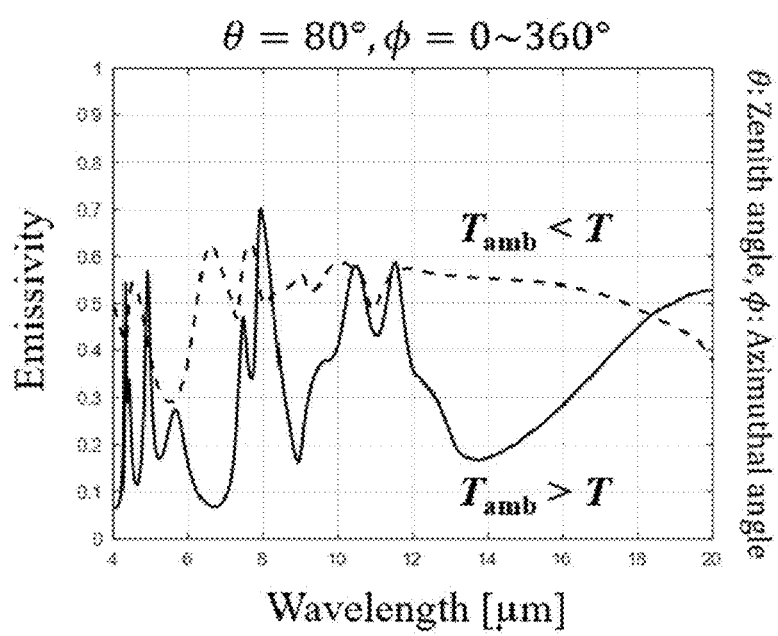
Figure 3A:
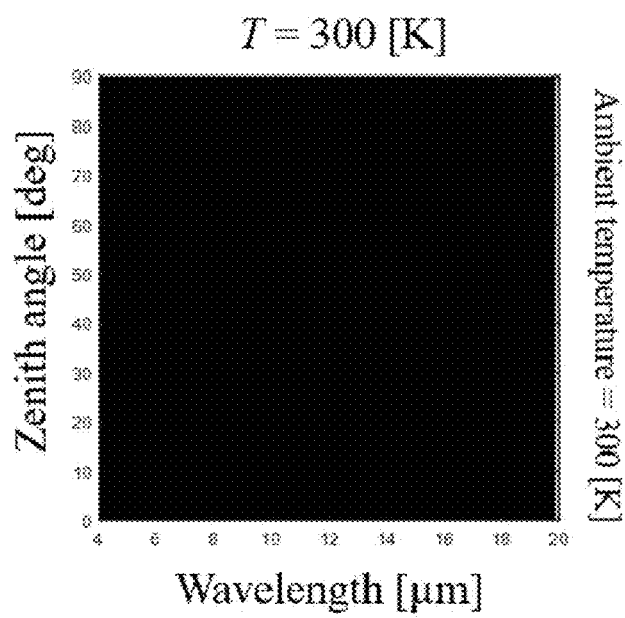
FIGS. 3A-3D show graphs of the ideal emissivity depending on the wavelength and angle at each temperature of the radiative cooling device according to an example of the present disclosure.
Figure 3B:
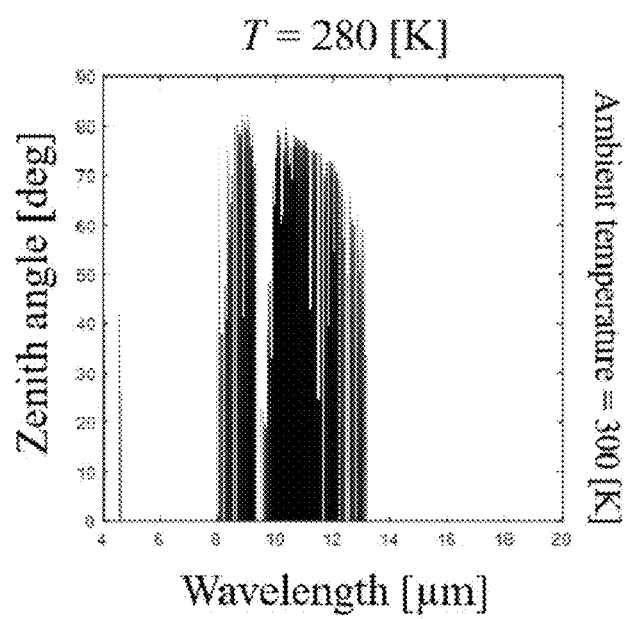
Figure 3C:
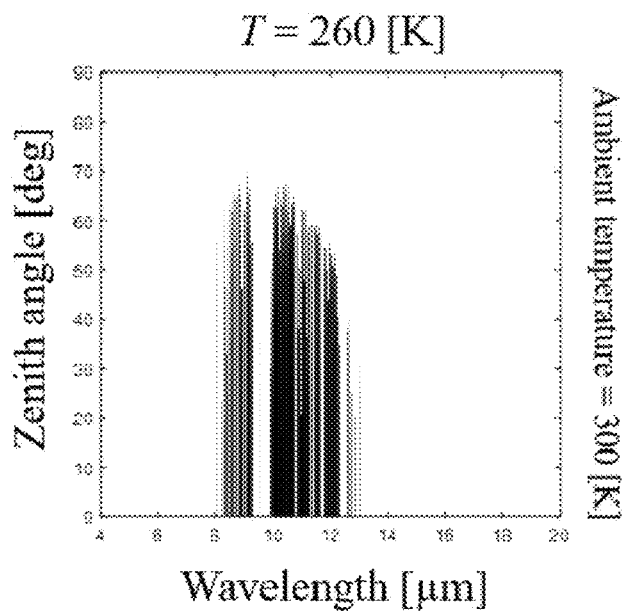
Figure 3D:
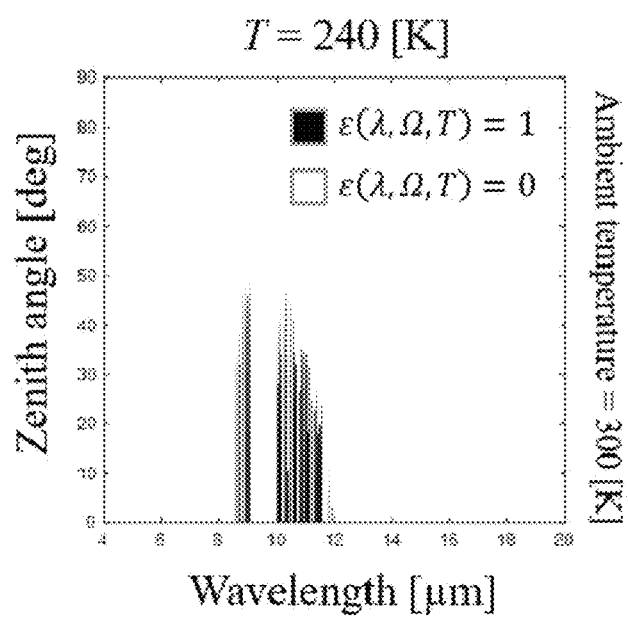

2A-2C). Specifically, an example of the present disclosure may be composed of nine (9) layers of a thin film in which a temperature-sensitive material ($VO_2$) and a temperature-insensitive material (selected from among $SiO_2$, Ge, SiC and ZnS) which does not change in refractive index even when the temperature changes are stacked. When the radiative cooling device is in parallel with the ground surface, if the temperature of the radiative cooling device is lower than the ambient temperature ($VO_2$ as a dielectric), the radiative cooling device shows a high emissivity in a wavelength range of from 8 μm to 13 μm at an angle of from 0° to 60° based on the axis perpendicular to the ground surface, whereas if the temperature of the radiative cooling device is equal to or higher than the ambient temperature ($VO_2$ as a conductor), the radiative cooling device shows a high emissivity in a wavelength range of from 4 μm to 20 μm (as well as at a wavelength of 20 μm or more although not shown in the drawings) at an angle of from 0° to 90° based on the axis perpendicular to the ground surface. Thus, it can be seen that it is possible to implement the radiative cooling device of the present disclosure in a simple structure with a simple material composition (FIG. 2A, FIG. 2B and FIG. 2C).

In an embodiment of the present disclosure, the radiative cooling device may be applied to sunlight power generation or building exterior tiles, but is not limited thereto. Specifically, the radiative cooling device according to the present disclosure can be designed in various ways by applying the sunlight spectrum having a wavelength of less than 4 μm. For example, the radiative cooling device can be applied to sunlight power generation, and in this case, the radiative cooling device may be designed to absorb wavelengths of sunlight as much as possible Therefore, the radiative cooling device can improve the efficiency of sunlight power generation by lowering the temperature of a sunlight power generator and increasing the absorptance of sunlight. Further, the radiative cooling device can be applied to building exterior tiles, and in this case, the radiative cooling device may reflect some wavelengths of visible light to present colors. Therefore, the radiative cooling device can save energy of the building and improve the aesthetic properties by lowering the temperature of the building to be equal to or lower than the ambient temperature and giving colors to the building.

Figure 4:
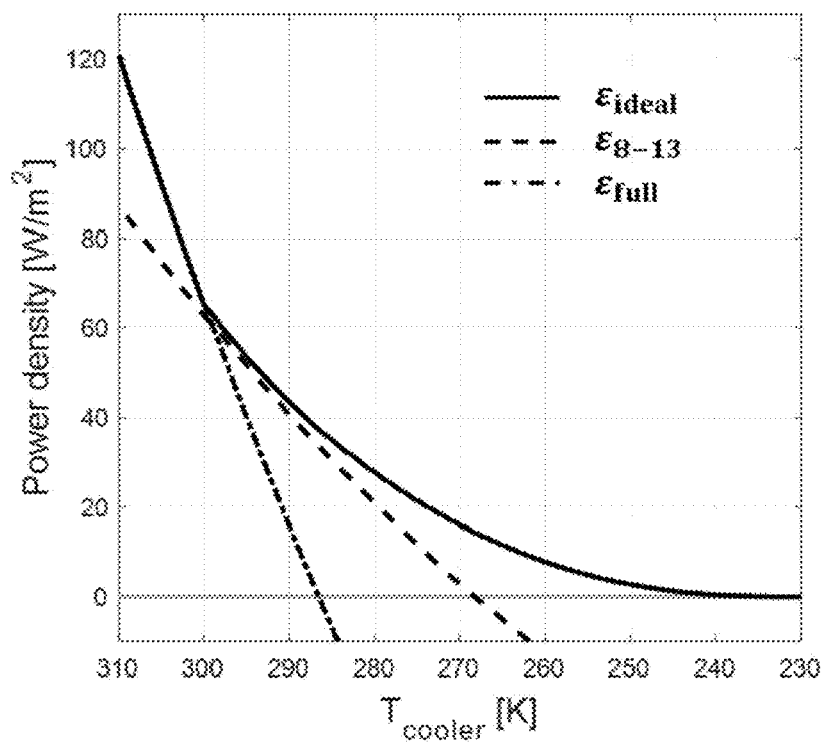
FIG. 4 shows a graph of the radiative power density depending on the temperature of the radiative cooling device according to an example of the present disclosure: a radiative cooling device according to Comparative Example 1 (emission only in a wavelength range of from 8 μm to 13 μm at any angle, $\varepsilon_{8-13}$); a radiative cooling device according to Comparative Example 2 (emission only in a wavelength range of from 4 μm to 20 μm at any angle, $\varepsilon_{full}$); and an ideal radiative cooling device (a radiative cooling device according to the present disclosure, $\varepsilon_{ideal}$).

Referring to FIG. 3A to FIG. 5, optical characteristics related to changes in temperature of the radiative cooling device caused by external environmental factors (weather, wind, cloud, etc.) when the radiative cooling device is in parallel with the ground surface can be seen. Specifically, referring to FIGS. 3A-3D, an ideal angle-dependent emissivity spectrum $\varepsilon(\lambda,\Omega,T)$ at each temperature of the radiative cooling device according to the present disclosure can be seen. A region with the maximum emissivity $\varepsilon(\lambda,\Omega,T)$ of 1 to emit 100% of radiative heat is shown in black, and a region with the minimum emissivity $\varepsilon(\lambda,\Omega,T)$ of 0 to block the absorption of radiative heat from the outside as much as possible is shown in white. It can be seen that when the radiative cooling device has a temperature equal to or higher than the ambient temperature (300K), the radiative cooling device shows an emissivity of 100% in a wavelength range of from 4 μm to 20 μm, and when the radiative cooling device has a temperature lower than the ambient temperature (280K, 260K, 240K), the radiative cooling device shows an emissivity of 100% at a wavelength selected from a wavelength range of from 8 μm to 13 μm. It can be seen that when the temperature of the radiative cooling device is normal temperature (300K) and lower than the normal temperature (280K, 260K, 240K), there is a large difference in the angle-dependent emissivity spectrum. In particular, it can be seen that the radiative cooling device needs to emit radiative heat mainly in a very narrow temperature range of from 10 μm to 12 μm to reach the extreme cooling temperature. Referring to FIG. 4, the radiative power density depending on a temperature $T_{cooler}$ of the radiative cooling device when the ambient temperature is the normal temperature (300K) can be seen. Herein, $\varepsilon_{ideal}$ represents the radiative cooling device according to the present disclosure in which the angle-dependent emissivity spectrum is adjusted in consideration of the ambient temperature and the temperature of the radiative cooling device, $\varepsilon_{8-13}$ represents Comparative Example 1 designed to perform emission only in a wavelength range of from 8 μm to 13 μm at any angle, and $\varepsilon_{full}$ represents Comparative Example 1 designed to perform emission in the entire mid-IR range at any angle. Example, Comparative Example 1 and Comparative Example 2 show radiative energy densities similar to each other at about the normal temperature, but as the temperature of the radiative cooling device decreases to be lower than the ambient temperature, differences among them increase. When the temperature of the radiative cooling device is higher than the ambient temperature, Example and Comparative Example 2 show the same behavior but Comparative Example 1 shows a low radiative energy density (FIG. 4).

Figure 5:
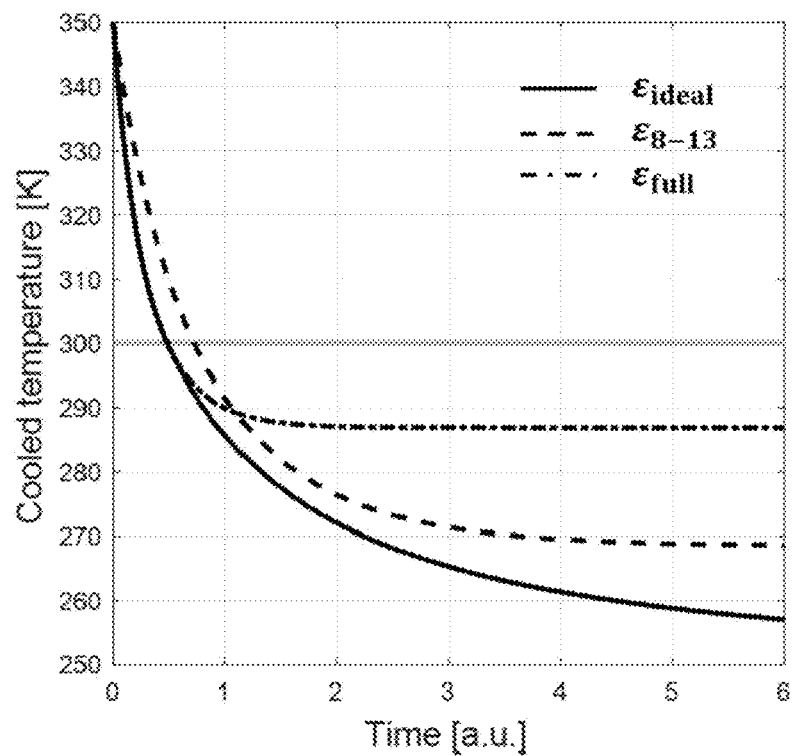
FIG. 5 is a graph showing the lower limits of a cooling rate and a cooling temperature: a radiative cooling device according to Comparative Example 1 (emission only in a wavelength range of from 8 μm to 13 μm at any angle, $\varepsilon_{8-13}$); a radiative cooling device according to Comparative Example 2 (emission only in a wavelength range of from 4 μm to 20 μm at any angle, $\varepsilon_{full}$); and an ideal radiative cooling device (a radiative cooling device according to the present disclosure, $\varepsilon_{ideal}$).

Referring to FIG. 5, cooling performance can be seen from a cooling rate and the lower limits of cooling temperature. Specifically, the cooling performance of the radiative cooling device according to the present disclosure in which the angle-dependent emissivity spectrum $\varepsilon_{ideal}$ is adjusted in consideration of the ambient temperature and the temperature of the radiative cooling device, the cooling performance of Comparative Example 1 for the emissivity $\varepsilon_{8-13}$ designed to perform emission in a wavelength range of from 8 μm to 13 μm at any angle, and the cooling performance of Comparative Example 2 for the emissivity $\varepsilon_{full}$ designed to perform emission in the entire mid-IR range at any angle can be seen. Comparative Example 1 exhibits a low initial cooling rate and Comparative Example 2 shows a final cooling temperature that is not sufficiently low. However, it can be seen that Example of the present disclosure can perform cooling to 260K or less and exhibits an excellent cooling rate from the beginning of cooling.

Figure 6A:
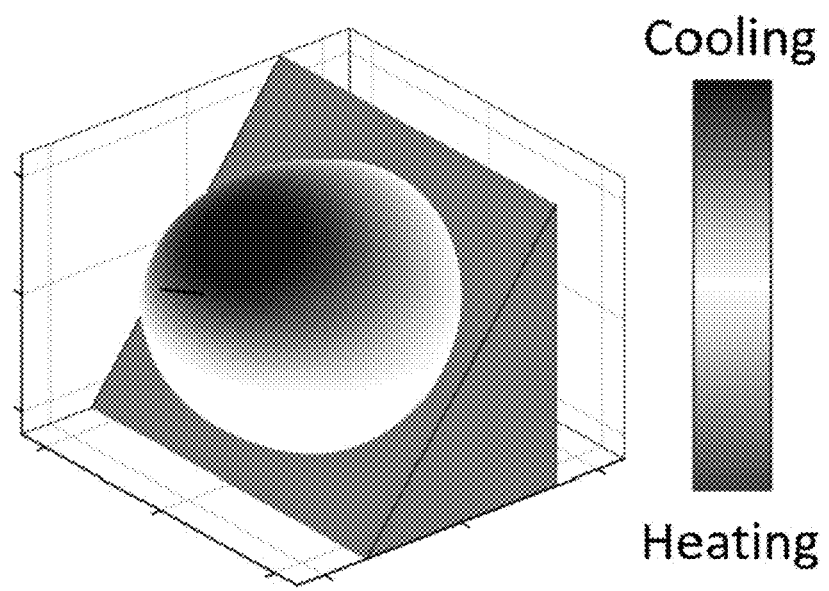
FIG. 6A is a graph of the effective radiance depending on the device temperature (300K) on a slanted surface in a conventional radiative cooling device.
Figure 6B:
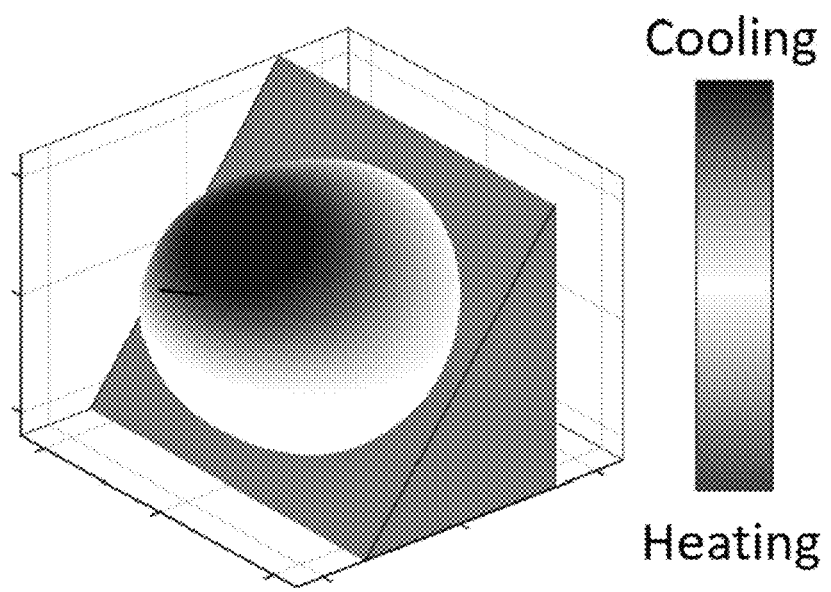
FIG. 6B is a graph of the effective radiance depending on the device temperature (300K) on a slanted surface in a radiative cooling device according to an example of the present disclosure.
Figure 6C:
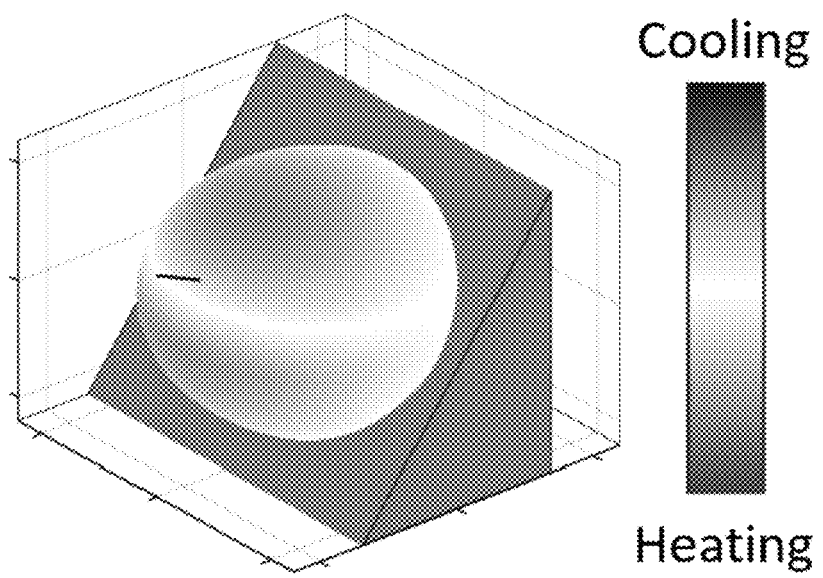
FIG. 6C is a graph of the effective radiance depending on the device temperature (280K) on the slanted surface in the conventional radiative cooling device.
Figure 6D:
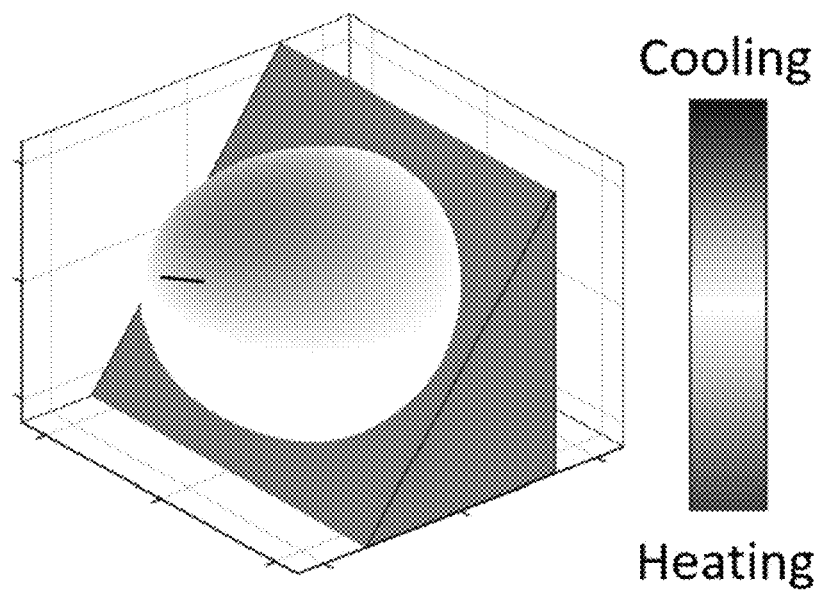
FIG. 6D is a graph of the effective radiance depending on the device temperature (280K) on the slanted surface in the radiative cooling device according to an example of the present disclosure.

Referring to FIG. 6A to FIG. 6D, a simulation result of radiative cooling performance depending on the emission angle when the radiative cooling device is not in parallel with the ground surface can be seen. Specifically, FIG. 6A and FIG. 6C show the cooling performance of Comparative Example 1 designed to perform emission only in a wavelength range of from 8 μm to 13 μm at any angle, and FIG. 6B and FIG. 6D show the cooling performance of Example of the present disclosure in which the angle-dependent emissivity spectrum is adjusted in consideration of the ambient temperature and the temperature of the radiative cooling device. Referring to FIG. 6A and FIG. 6B, it can be seen that when the temperature of the radiative cooling device is the normal temperature (300K), both Comparative Example 1 and Example can exhibit cooling performance. However, referring to FIG. 6C and FIG. 6D, it can be seen that when the temperature of the radiative cooling device is lower than the normal temperature (280K), Comparative Example 1 shows a heating portion as well as a cooling portion, whereas Example shows a cooling portion without a heating portion, which means Example sufficiently exhibits cooling performance. Specifically, in the simulation, when the temperatures (300K) of the radiative cooling devices of Example and Comparative Example 1 are equal to or higher than the normal temperature (300K), the radiative cooling device of Example can perform cooling by emitting thermal radiation in a wavelength of 4 µm or more at an angle of from 0° to 180° based on the axis perpendicular to the ground surface, and the radiative cooling device of Comparative Example 1 can perform cooling by emitting thermal radiation in a wavelength of from 8 µm to 13 µm at any angle (FIG. 6A and FIG. 6B). However, when the temperatures (270K) of the radiative cooling devices of Example and Comparative Example 1 are lower than the normal temperature (300K), the radiative cooling device of Example can still perform cooling by emitting thermal radiation in a wavelength of from 8 µm to 13 µm at an angle of from 0° to 60° based on the axis perpendicular to the ground surface (FIG. 6D), but the radiative cooling device of Comparative Example 1, which is designed to emit thermal radiation in a wavelength of from 8 µm to 13 µm at any angle, absorbs radiative heat incident from various matters (grass, soil, sand, water, etc.: emissivity of 90% or more) present on the ground surface and thus shows a heating portion, which may cause significant degradation in cooling efficiency (it is assumed that the ground surface and the matters present on the ground surface have an emissivity of 1 and a temperature of 300K).

A second aspect of the present disclosure provides a method of cooling an object using the radiative cooling device according to the first aspect.

In an embodiment of the present disclosure, the method may include locating the radiative cooling device on a surface of the object.

Descriptions of the parts common to the first aspect and the second aspect may be applied to both the first aspect and the second aspect, even though they are omitted hereinafter.

We claim:

1. A radiative cooling device that is sensitive to an ambient atmosphere temperature,
wherein an angle-dependent emissivity spectrum in the infrared range changes depending on the relative high and low of the temperature of the radiative cooling device with respect to the ambient atmosphere temperature,
wherein as for the radiative cooling device in parallel with a ground surface, the angle-dependent emissivity spectrum is represented by Equation 1, and
as for the radiative cooling device not in parallel with the ground surface, the angle-dependent emissivity spectrum is represented by Equation 2:

$$\varepsilon(\lambda,\Omega,T;\Omega_{sun},T_{amb},\alpha)=0.5\times[1+\text{sgn}(I_{BB}(\lambda,\Omega,T)-I_{sun}(\lambda,\Omega_{sun},T_{amb},\alpha)-I_{atm}(\lambda,\Omega,T_{amb},\alpha))];$$ [Equation 1]

$$\varepsilon(\lambda,\Omega,T;\Omega_{sun},T_{amb},\alpha,R,\Omega_{rotation})=0.5\times[1+\text{sgn}(I_{BB}(\lambda,\Omega,T)-R(I_{sun}(\lambda,\Omega_{sun},T_{amb},\alpha)+I_{atm}(\lambda,\Omega,T_{amb},\alpha))-(1-R)I_{ground}(\lambda,\Omega_{sun},T_{amb},\alpha,\Omega_{rotation}))];$$ [Equation 2]

in the Equation 1 and the Equation 2,
$\varepsilon(\Delta,\Omega,T)$ represents an angle-dependent emissivity spectrum in the infrared range depending on a temperature T of the radiative cooling device,
$\Omega_{sun}$ represents an incident angle of sunlight,
$T_{amb}$ is a temperature of the ambient atmosphere,
$\alpha$ represents an environmental factor,
R represents a reflectivity of an ambient environment,
$\Omega_{rotation}$ represents a tilt angle of the radiative cooling device,
$I_{BB}(\lambda,\Omega,T)$ represents an angle-dependent spectral radiance corresponding to the temperature T,
$I_{sun}(\lambda,\Omega_{sun},T_{amb},\alpha)$ represents an angle-dependent spectral radiance of the sun,
$I_{atm}(\lambda,\Omega,T_{amb},\alpha)$ represents an angle-dependent spectral radiance of the atmosphere,
$I_{ground}(\lambda,\Omega_{sun},T_{amb},\alpha,\Omega_{rotation})$ represents an angle-dependent spectral radiance of the ambient environment, and
the $\Omega$ includes the azimuth angle and the zenith angle in a spherical coordinate system based on an axis perpendicular to the ground surface.

2. The radiative cooling device of claim 1,
wherein the radiative cooling device shows changes in the angle-dependent emissivity spectrum in real time depending on changes in the external environment.

3. The radiative cooling device of claim 1,
wherein when the temperature of the radiative cooling device is equal to or higher than the ambient atmosphere temperature,
the radiative cooling device in parallel with a ground surface emits thermal radiation in a wavelength of 4 µm or more at an angle of from 0° to 90° based on an axis perpendicular to the ground surface, and
the radiative cooling device not in parallel with the ground surface emits thermal radiation in a wavelength of 4 µm or more at an angle of from 0° to 180° based on the axis perpendicular to the ground surface.

4. The radiative cooling device of claim 1,
wherein when the temperature of the radiative cooling device is lower than the ambient atmosphere temperature,
the radiative cooling device emits thermal radiation in a wavelength of from 8 µm to 13 µm at an angle of from 0° to 60° based on an axis perpendicular to a ground surface regardless of placement.

5. The radiative cooling device of claim 4,
wherein the radiative cooling device emits thermal radiation in a wavelength of from 10 µm to 12 µm at an angle of from 0° to 60° based on the axis perpendicular to the ground surface regardless of placement, and, thus, the temperature of the radiative cooling device is lower by 5° C. or more than the ambient atmosphere temperature.

6. The radiative cooling device of claim 1,
wherein the angle-dependent emissivity spectrum is changed by a change in refractive index of a constituent material of the radiative cooling device depending on the ambient atmosphere temperature, a change in refractive index caused by a phase change, or both of them.

7. The radiative cooling device of claim 1,
wherein the radiative cooling device includes a polymer layer composed of a multilayer thin film, a nanopattern and dispersed nanoparticles, and one or more selected from metamaterials.

8. The radiative cooling device of claim 1,
wherein a whole or a part of the radiative cooling device includes: a first material which changes in refractive index depending on the ambient atmosphere temperature; a second material which changes in refractive index caused by a phase change depending on the ambient atmosphere temperature; or both of them.

9. The radiative cooling device of claim 1,
wherein a whole or a part of the radiative cooling device includes: one or more selected from doped vanadium dioxide ($VO_2$); doped or undoped $V_xO_y$(x is an integer of from 2 to 4 and Y is an integer of from 2 to 10); paraffin; and paraffin-based organic or inorganic phase-change materials (PCM).

10. A method of cooling an object using a radiative cooling device of claim 1.

11. The method of cooling an object using a radiative cooling device of claim 10, comprising:
   locating the radiative cooling device on a surface of the object.

\* \* \* \* \*